F. O. SCHNELLE.
METHOD OF ELECTRICALLY CHARGING ELECTROSTATIC SEPARATING DEVICES.
APPLICATION FILED DEC. 27, 1904.
1,026,464.
Patented May 14, 1912.
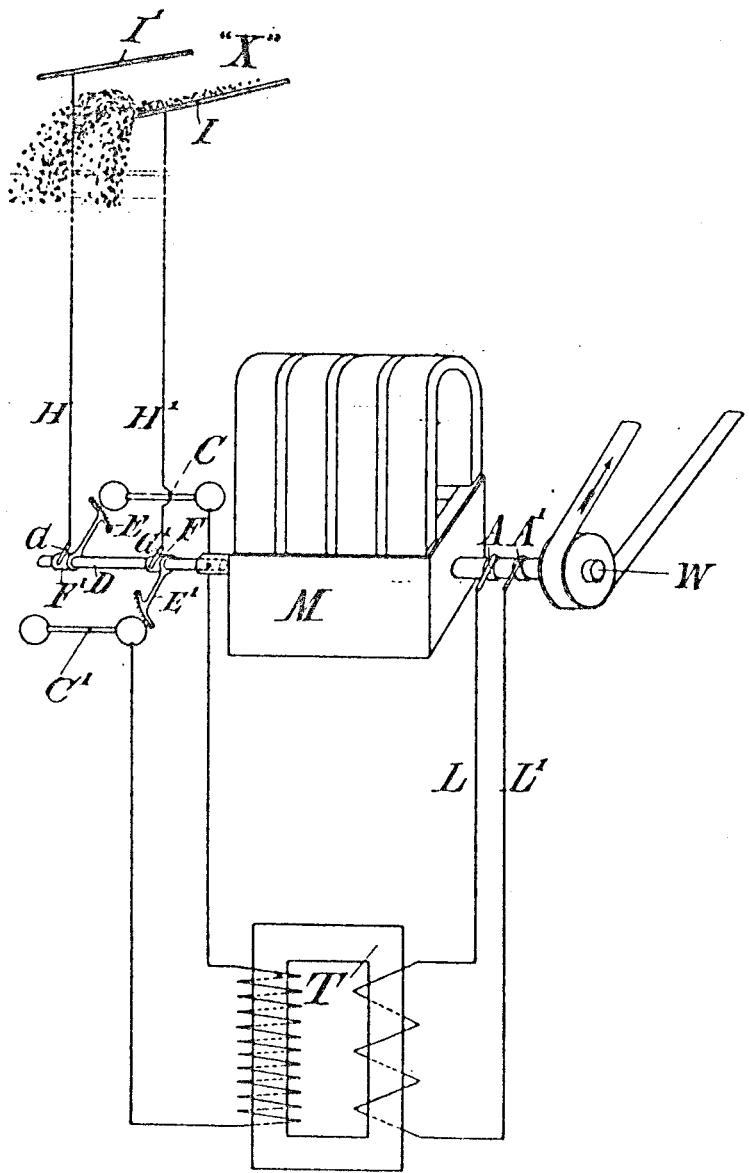

UNITED STATES PATENT OFFICE.

FRIEDRICH OSCAR SCHNELLE, OF FRANKFORT-ON-THE-MAIN, GERMANY.

METHOD OF ELECTRICALLY CHARGING ELECTROSTATIC SEPARATING DEVICES.

1,026,464.  Specification of Letters Patent.  Patented May 14, 1912.

Application filed December 27, 1904. Serial No. 238,387.

*To all whom it may concern:*

Be it known that I, FRIEDRICH OSCAR SCHNELLE, engineer, residing at 18 Guiollett-strasse, Frankfort-on-the-Main, German Empire, have invented certain new and useful Improvements in Methods of Electrically Charging Electrostatic Separating Devices, of which the following is a specification.

This invention relates to a method of electrically charging electrostatic separating devices for the dry separation or concentration of comminuted granular materials, ores, minerals &c.

The object of my invention is to maintain the active parts of the separating device at a charge of constant potential by the employment of apparatus suited for permanent operation and capable of exact regulation.

Heretofore the static-machine was considered as practically the only source of electricity of constant potential adapted to the special requirements of electro-static separation. It has also been proposed to use the Ruhmkorff induction coil "as a suitable source of statical electricity of high potential", but this apparatus is unsuited for the separating processes to which the present invention especially applies, viz. those which require a uniform charge of constant potential.

My invention particularly consists in a method of applying electricity of periodically changing or alternating potential to the particular requirements of electro-static separation.

I have discovered that, owing to the property of electro-static separating devices to act as condensers of electricity, the active parts of separators may be charged to a uniform and constant potential and permanently maintained in the "statically" charged state, by an intermittent or periodic communication of these parts—either conductively or inductively—with a suitable source of high potential electricity.

In accordance with this discovery I have found that a source of periodically changing or alternating potential can be applied for this purpose, provided that a periodic communication between the source of energy and the parts to be charged is made in suitable time intervals, viz. at moments when the potential of the respective generator poles is of the desired value and has the same sign.

One way by which this periodic communication may be effected is illustrated in the annexed drawing, showing the electric apparatus and its connections, partly in perspective, and in part diagrammatically.

M represents a magneto-electric generator driven by any suitable source of power by means of belt and pulley, as shown, or other suitable gear.

A A' are collector rings mounted upon the machine shaft W and connected by brushes B B' and wires L L' to the primary winding of the transformer T. The secondary winding of the transformer is connected to the insulated conductors C C' placed parallel to the insulated axle D which is coupled with the machine shaft W.

E E' are two rotating collector arms mounted upon the axle D at an angle of 180° and provided with hubs F F'. The hubs F F' are connected by means of contact springs G G' and wires H H' with the opposing poles I I' of a static separator, as indicated by "X".

The operation of this apparatus will be readily understood from the above description.

Periodic or alternating current is generated by the machine M, and transformed to a suitably high potential by the transformer T. The secondary terminals C C' of the transformer being alternately connected by the synchronous pole changing collectors E E' to the corresponding parts I I' of the separator "X" transmit to the latter electric charges of like sign and like (mean) potential. The individual charges thus transmitted to the opposite "poles" of the separator are condensed upon the respective surfaces, thus bringing their potential to the required intensity and keeping the charge up constantly at this value. Since the opposing "pole" surfaces of the separator are sufficiently far apart from each other to prevent disruptive discharges the individual charges, continuously transmitted at each half revolution of the axle D, only represent a very small quantity of electricity, sufficient to replenish the small amount carried off continuously by the material (dry comminuted ores, &c.) under treatment and due to imperfection of the insulation of the charged parts of the separating machine.

While the apparatus described illustrates the method of simultaneously charging the opposing parts of the separator by putting them in direct communication with the bipolar commutator E E', the invention is by no means limited to this special *modus operandi*. Thus only one condenser element such as I may be put in direct communication (either conductively or inductively) with the selecting or rectifying device while the other pole may be grounded.

In general it is to be understood that the present invention does not refer to any special type of separator and is not limited to the special kind of generating and pole changing devices shown and described.

What I claim is:

1. The method of maintaining a working charge at substantially constant potential of the desired value on the active part of an electrostatic separator, which consists in establishing said working charge thereon, and during the period that the charge is exercising its separating effect, maintaining the charge at substantially constant potential by the periodic transmission of fractional charges from a source of electrical energy having a potential which does not substantially exceed the desired potential of the charge; substantially as described.

2. The method of maintaining a working charge at substantially constant potential of the desired value on the active part of an electrostatic separator, which consists in establishing said working charge thereon, and during the period that the charge is exercising its separating effect, maintaining the charge at substantially constant potential by the periodic transmission of fractional charges from a source of electrical energy of periodically changing potential which does not substantially exceed the desired potential of the charge, such fractional charges being synchronously collected during transmission; substantially as described.

3. The method of electrically charging the active parts of an electrostatic separator and maintaining the charge at substantially constant potential of the desired value, which consists in establishing such charge, and periodically establishing communication between a source of periodically changing potential and the parts to be charged at moments when the potential of the respective poles of the source is of the same sign as the parts to be charged and does not substantially exceed the desired potential of the charge; substantially as described.

4. The method of electrically charging the active parts of an electrostatic separator and maintaining the charge at substantially constant potential of the desired value, which consists in establishing such a charge, generating a periodically changing potential of relatively low value, transforming said potential to increase its value and periodically establishing communication between the transformer and the parts to be charged at moments when the potential of the desired value of the respective poles of the transformer is of the same sign as the parts to be charged and does not substantially exceed the desired potential of the charge; substantially as described.

5. The method of electrically charging the active parts of an electrostatic separator and maintaining the charge at substantially constant potential of the desired value, which consists in generating a periodically changing potential of relatively low value, transforming said potential to increase it to a value which does not substantially exceed the desired potential of the charge, rectifying said potential, and conducting the rectified charges to the active parts of the separator; substantially as described.

6. The method of electrically charging the active parts of an electrostatic separator and maintaining the charge at substantially constant potential of the desired value, which consists in establishing a working charge of constant potential for the active parts of the separator, and periodically supplying to said active parts small increments of charge corresponding substantially to the discharge; substantially as described.

In testimony, that I claim the foregoing as my invention, I have signed my name in presence of two witnesses, this 14th day of December 1904.

FRIEDRICH OSCAR SCHNELLE.

Witnesses:
 JEAN GRUND,
 CARL GRUND.

them in direct communication with the bipolar commutator E E', the invention is by no means limited to this special *modus operandi*. Thus only one condenser element such as I may be put in direct communication (either conductively or inductively) with the selecting or rectifying device while the other pole may be grounded.

In general it is to be understood that the present invention does not refer to any special type of separator and is not limited to the special kind of generating and pole changing devices shown and described.

What I claim is:

1. The method of maintaining a working charge at substantially constant potential of the desired value on the active part of an electrostatic separator, which consists in establishing said working charge thereon, and during the period that the charge is exercising its separating effect, maintaining the charge at substantially constant potential by the periodic transmission of fractional charges from a source of electrical energy having a potential which does not substantially exceed the desired potential of the charge; substantially as described.

2. The method of maintaining a working charge at substantially constant potential of the desired value on the active part of an electrostatic separator, which consists in establishing said working charge thereon, and during the period that the charge is exercising its separating effect, maintaining the charge at substantially constant potential by the periodic transmission of fractional charges from a source of electrical energy of periodically changing potential which does not substantially exceed the desired potential of the charge, such fractional charges being synchronously collected during transmission; substantially as described.

3. The method of electrically charging the active parts of an electrostatic separator and maintaining the charge at substantially constant potential of the desired value, which consists in establishing such charge, and periodically establishing communication between a source of periodically changing potential and the parts to be charged at moments when the potential of the respective poles of the source is of the same sign as the parts to be charged and does not substantially exceed the desired potential of the charge; substantially as described.

4. The method of electrically charging the active parts of an electrostatic separator and maintaining the charge at substantially constant potential of the desired value, which consists in establishing such a charge, generating a periodically changing potential of relatively low value, transforming said potential to increase its value and periodically establishing communication between the transformer and the parts to be charged at moments when the potential of the desired value of the respective poles of the transformer is of the same sign as the parts to be charged and does not substantially exceed the desired potential of the charge; substantially as described.

5. The method of electrically charging the active parts of an electrostatic separator and maintaining the charge at substantially constant potential of the desired value, which consists in generating a periodically changing potential of relatively low value, transforming said potential to increase it to a value which does not substantially exceed the desired potential of the charge, rectifying said potential, and conducting the rectified charges to the active parts of the separator; substantially as described.

6. The method of electrically charging the active parts of an electrostatic separator and maintaining the charge at substantially constant potential of the desired value, which consists in establishing a working charge of constant potential for the active parts of the separator, and periodically supplying to said active parts small increments of charge corresponding substantially to the discharge; substantially as described.

In testimony, that I claim the foregoing as my invention, I have signed my name in presence of two witnesses, this 14th day of December 1904.

FRIEDRICH OSCAR SCHNELLE.

Witnesses:
 JEAN GRUND,
 CARL GRUND.

It is hereby certified that in Letters Patent No. 1,026,464, granted May 14, 1912, upon the application of Friedrich Oscar Schnelle, of Frankfort-on-the-Main, Germany, for an improvement in "Methods of Electrically Charging Electrostatic Separating Devices," an error appears in the printed specification requiring correction as follows: Page 2, lines 66–67, strike out the words "of the desired value"; and that the said Letters Patent should be read with this correction therein that the same may conform to the record of the case in the Patent Office.

Signed and sealed this 11th day of June, A. D. 1912.

[SEAL.]

C. C. BILLINGS,

*Acting Commissioner of Patents.*

It is hereby certified that in Letters Patent No. 1,026,464, granted May 14, 1912, upon the application of Friedrich Oscar Schnelle, of Frankfort-on-the-Main, Germany, for an improvement in "Methods of Electrically Charging Electrostatic Separating Devices," an error appears in the printed specification requiring correction as follows: Page 2, lines 66–67, strike out the words "of the desired value"; and that the said Letters Patent should be read with this correction therein that the same may conform to the record of the case in the Patent Office.

Signed and sealed this 11th day of June, A.D., 1912.

[SEAL.]

C. C. BILLINGS,

Acting Commissioner of Patents.